(12) United States Patent
Diaz

(10) Patent No.: US 6,450,653 B1
(45) Date of Patent: Sep. 17, 2002

(54) TRI-FACETED VEHICLE SIDE VIEW MIRROR ASSEMBLY

(76) Inventor: Carlos L. Diaz, 116 Surrey Way, Fillmore, CA (US) 93015

( * ) Notice: Subject to any disclaimer, the term of this patent is extended or adjusted under 35 U.S.C. 154(b) by 0 days.

(21) Appl. No.: 09/871,354

(22) Filed: May 31, 2001

(51) Int. Cl.$^7$ .................................................. G02B 5/08

(52) U.S. Cl. ..................... 359/866; 359/867; 359/870; 359/871; 359/872

(58) Field of Search ................................ 359/866, 867, 359/870, 871, 872, 879, 880, 881, 838, 849, 850; 248/475.1, 490

(56) References Cited

U.S. PATENT DOCUMENTS

| 4,266,856 A | * | 5/1981 | Wainwright | 350/281 |
| 4,398,239 A | * | 8/1983 | De Vos et al. | 362/263 |
| 4,740,068 A | * | 4/1988 | Fisher | 350/634 |
| 5,586,393 A | * | 12/1996 | Pherigo et al. | 33/288 |

* cited by examiner

Primary Examiner—Mohammad Sikder
(74) Attorney, Agent, or Firm—Joseph N. Breaux

(57) ABSTRACT

A tri-faceted side view mirror assembly having a tri-faceted vehicle side view mirror that provides an increased viewing angled which encompasses the side and back side of a vehicle. The tri-faceted vehicle side view mirror assembly includes a two-part housing securable to the side of a vehicle and a tri-faceted mirror member held within the two-part housing.

1 Claim, 2 Drawing Sheets

TRI-FACETED VEHICLE SIDE VIEW MIRROR ASSEMBLY

TECHNICAL FIELD

The present invention relates to vehicle mirror assemblies and more particularly to a tri-faceted vehicle side view mirror assembly that includes a two-part housing securable to a side of a vehicle and a tri-faceted mirror member held within the two-part housing; the tri-faceted mirror member being constructed from an acrylic plastic having a reflective coating provided on a back surface thereof and including a planar center mirror section and two mirror image angled opposed mirror end sections that extend from opposed side edges of the planar center section in the forward direction; the two-part housing including a molded top housing portion and a molded bottom housing portion that are secured together with screws; the top and bottom housing portions each having an open mirror connecting end section provided with a mirror opening; the top housing portion having three top channel mirror attachment fixtures secured adjacent to the mirror opening and including a top center channel mirror attachment fixture and two top side channel mirror attachment fixtures, on either side of the top center channel attachment fixture and oriented with respect to the top center channel mirror attachment fixture such that when a top center edge of the mirror center section is seated into the top center channel mirror attachment fixture, a top side edge of a side mirror section is seated in each of the two top side channel mirror attachment fixtures; the bottom housing portion having three bottom channel mirror attachment fixtures secured adjacent to the mirror opening and including a bottom center channel mirror attachment fixture and two bottom side channel mirror attachment fixtures, one on either side of the bottom center channel attachment fixture and oriented with respect to the bottom center channel mirror attachment fixture such that when a bottom center edge of the mirror center section is seated into the bottom center channel mirror attachment fixture, a bottom side edge of a side mirror section is seated in each of the two bottom side channel mirror attachment fixtures; the top and bottom housing portions being sized such that when the top and bottom housing portions are secured together; the tri-faceted mirror is secured across the mirror openings; the two-part housing being securable to a side of a vehicle.

BACKGROUND ART

Each year traffic accidents are caused by motorists changing lanes while another vehicle is in their blind spot. Although these motorists may have checked their vehicle side view mirrors, they were unable to see the other vehicle because conventional planar side view mirrors do not have the viewing angle necessary to show the entire side and back side of the road next to the vehicle. When the driving motorists forgets about the blind spot, an accident can happen. It would be a benefit, therefore, to have a tri-faceted mirror that had an increased viewing angled which encompassed the side and back side of the vehicle so that there would be no need for the driver to remember about the blind spot because the blind spot would be eliminated.

GENERAL SUMMARY DISCUSSION OF INVENTION

It is thus an object of the invention to provide a tri-faceted vehicle side view mirror assembly that includes a two-part housing securable to a side of a vehicle and a tri-faceted mirror member held within the two-part housing; the tri-faceted mirror member being constructed from an acrylic plastic having a reflective coating provided on a back surface thereof and including a planar center mirror section and two mirror image angled opposed mirror end sections that extend from opposed side edges of the planar center section in the forward direction; the two-part housing including a molded top housing portion and a molded bottom housing portion that are secured together with screws; the top and bottom housing portions each having an open mirror connecting end section provided with a mirror opening; the top housing portion having three top channel mirror attachment fixtures secured adjacent to the mirror opening and including a top center channel mirror attachment fixture and two top side channel mirror attachment fixtures, on either side of the top center channel attachment fixture and oriented with respect to the top center channel mirror attachment fixture such that when a top center edge of the mirror center section is seated into the top center channel mirror attachment fixture, a top side edge of a side mirror section is seated in each of the two top side channel mirror attachment fixtures; the bottom housing portion having three bottom channel mirror attachment fixtures secured adjacent to the mirror opening and including a bottom center channel mirror attachment fixture and two bottom side channel mirror attachment fixtures, one on either side of the bottom center channel attachment fixture and oriented with respect to the bottom center channel mirror attachment fixture such that when a bottom center edge of the mirror center section is seated into the bottom center channel mirror attachment fixture, a bottom side edge of a side mirror section is seated in each of the two bottom side channel mirror attachment fixtures; the top and bottom housing portions being sized such that when the top and bottom housing portions are secured together; the tri-faceted mirror is secured across the mirror openings; the two-part housing being securable to a side of a vehicle.

Accordingly, a tri-faceted vehicle side view mirror assembly is provided. The tri-faceted vehicle side view mirror assembly includes a two-part housing securable to a side of a vehicle and a tri-faceted mirror member held within the two-part housing; the tri-faceted mirror member being constructed from an acrylic plastic having a reflective coating provided on a back surface thereof and including a planar center mirror section and two mirror image angled opposed mirror end sections that extend from opposed side edges of the planar center section in the forward direction; the two-part housing including a molded top housing portion and a molded bottom housing portion that are secured together with screws; the top and bottom housing portions each having an open mirror connecting end section provided with a mirror opening; the top housing portion having three top channel mirror attachment fixtures secured adjacent to the mirror opening and including a top center channel mirror attachment fixture and two top side channel mirror attachment fixtures, on either side of the top center channel attachment fixture and oriented with respect to the top center channel mirror attachment fixture such that when a top center edge of the mirror center section is seated into the top center channel mirror attachment fixture, a top side edge of a side mirror section is seated in each of the two top side channel mirror attachment fixtures; the bottom housing portion having three bottom channel mirror attachment fixtures secured adjacent to the mirror opening and including a bottom center channel mirror attachment fixture and two bottom side channel mirror attachment fixtures, one on either side of the bottom center channel attachment fixture and oriented with respect to the bottom center channel mirror attachment fixture such that when a bottom center edge of the mirror center section is seated into the bottom center channel mirror attachment fixture, a bottom side edge of a side mirror section is seated in each of the two bottom side channel mirror attachment fixtures; the top and bottom housing portions being sized such that when the top and bottom housing portions are secured together; the tri-faceted mirror is secured across the mirror openings; the two-part housing being securable to a side of a vehicle.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
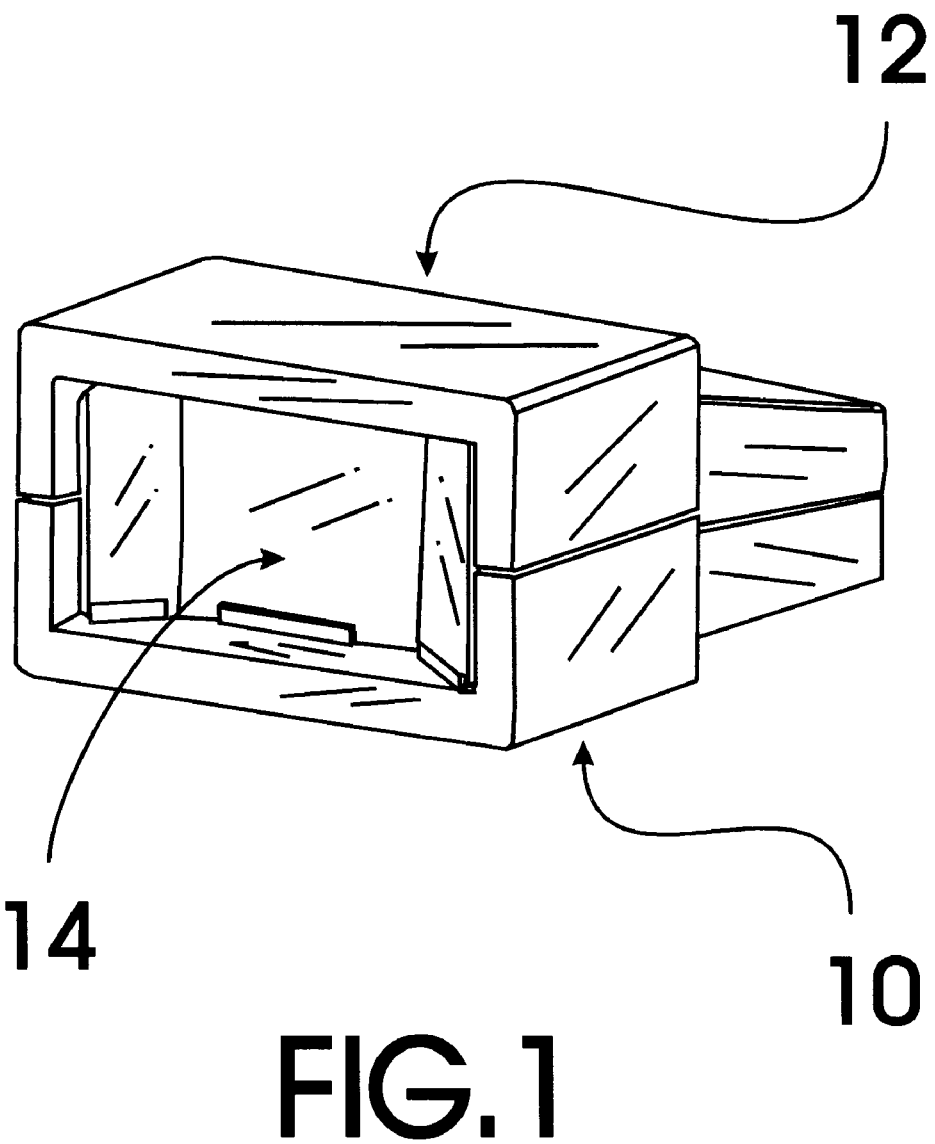
FIG. 1 is an perspective view of an exemplary embodiment of the tri-faceted vehicle side view mirror assembly of the present invention.
Figure 2:
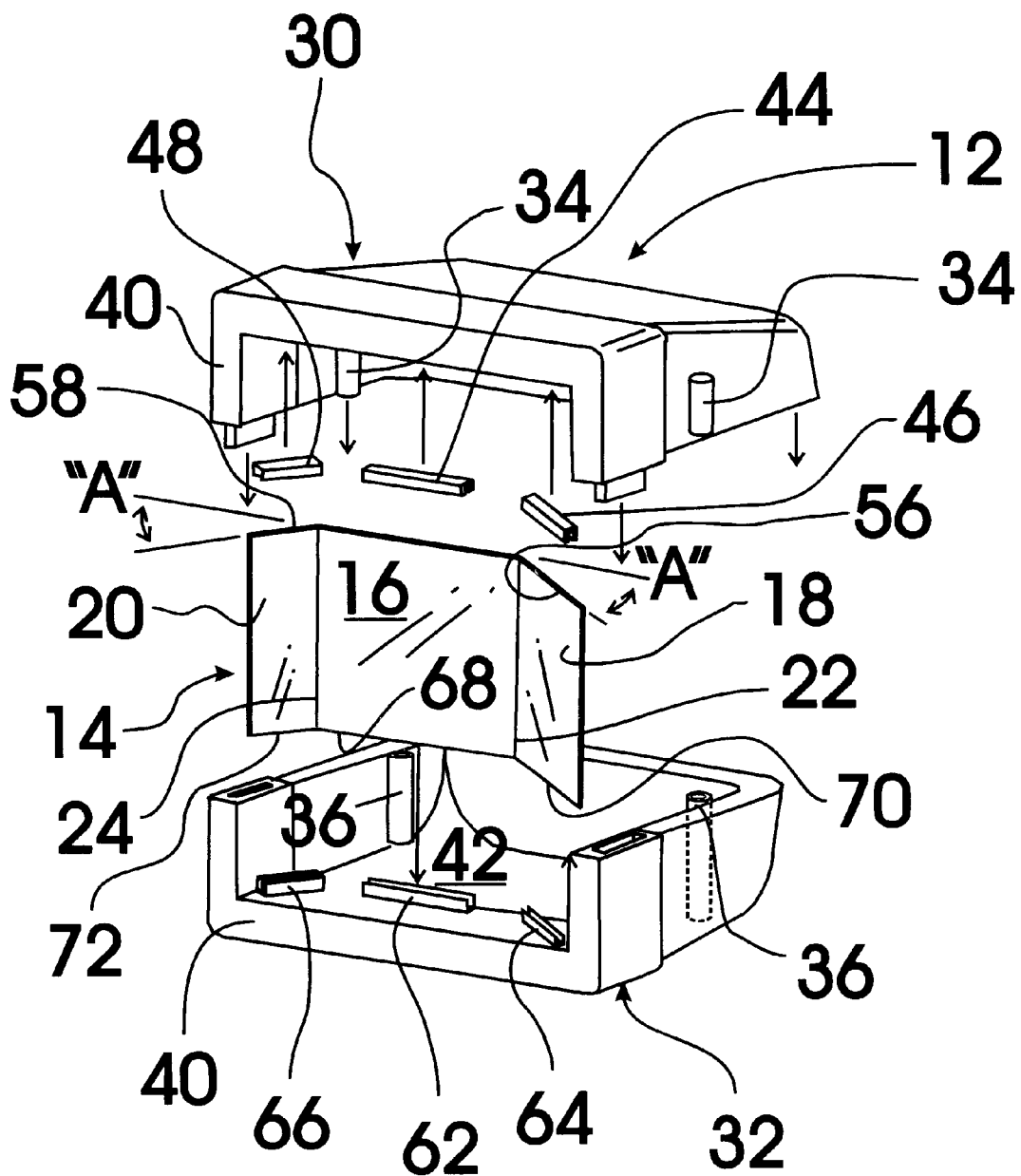
FIG. 2 is an exploded perspective view of the exemplary tri-facet vehicle side view mirror assembly of FIG. 1 showing the two-part housing and the tri-facet mirror member the tri-faceted mirror member being constructed from an acrylic plastic having a reflective coating provided on a back surface thereof and including a planar center mirror section and two mirror image angled opposed mirror end sections that extend from opposed side edges of the planar center section in the forward direction; the two-part housing including a molded top housing portion and a molded bottom housing portion that are secured together with screws; the top and bottom housing portions each having an open mirror connecting end section provided with a mirror opening; the top housing portion having three top channel mirror attachment fixtures secured adjacent to the mirror opening and including a top center channel mirror attachment fixture and two top side channel mirror attachment fixtures, one on either side of the top center channel attachment fixture and oriented with respect to the top center channel mirror attachment fixture such that when a top center edge of the mirror center section is seated into the top center channel mirror attachment fixture, a top side edge of a side mirror section is seated in each of the two top side channel mirror attachment fixtures; the bottom housing portion having three bottom channel mirror attachment fixtures secured adjacent to the mirror opening and including a bottom center channel mirror attachment fixture and two bottom side channel mirror attachment fixtures, one on either side of the bottom center channel attachment fixture and oriented with respect to the bottom center channel mirror attachment fixture such that when a bottom center edge of the mirror center section is seated into the bottom center channel mirror attachment fixture, a bottom side edge of a side mirror section is seated in each of the two bottom side channel mirror attachment fixtures; the top and bottom housing portions being sized such that when the top and bottom housing portions are secured together; the tri-faceted mirror is secured across the mirror openings; the two-part housing being securable to a side of a vehicle.

FIGS. 1 and 2 show various aspects of an exemplary embodiment of the tri-facet vehicle side view mirror assembly of the present invention generally designated 10. Tri-facet vehicle side view mirror assembly 10 includes a two-part housings generally designated 12, securable to a side of a vehicle and a tri-faceted mirror member, generally designated 14, held within two-part housing 12.

Tri-faceted mirror member 14 is constructed from an acrylic plastic having a reflective coating provided on a back surface thereof and includes a planar center mirror section 16 and two mirror image angled opposed mirror end sections 18, 20 that extend at and angle "A" of approximately fifteen degrees from opposed side edges 22, 24 of planar center section 16 in the forward direction.

Two-part housing 12 includes a molded top housing portion, generally designated 30 and a molded bottom housing portion, generally designated 32 that are secured together with screws at screw attachment points 34, 36. Top and bottom housing portions 30, 32 each have an open mirror connecting end section 40 provided with a mirror opening 42. Top housing portion 30 has three top channel mirror attachment fixtures secured adjacent to mirror opening 42 including a top center channel mirror attachment fixture 44 and two top side channel mirror attachment fixtures 46, 48, on either side of top center channel attachment fixture 44 and oriented with respect to top center channel mirror attachment fixture 44 such that when a top center edge 50 of the mirror center section 16 is seated into top center channel mirror attachment fixture 44, a top side edge 56, 58 of a side mirror section 18, 20 is seated in each of the two top side channel mirror attachment fixtures 46, 48.

Bottom housing portion 32 has three bottom channel mirror attachment fixtures secured adjacent to mirror opening 42 including a bottom center channel mirror attachment fixture 62 and two bottom side channel mirror attachment fixtures 64, 66, one on either side of bottom center channel attachment fixture 62 and oriented with respect to bottom center channel mirror attachment fixture 62 such that when a bottom center edge 68 of mirror center section 16 is seated into bottom center channel mirror attachment fixture 62, a bottom side edge 70, 72 of a side mirror section 18, 20 is seated in each of two bottom side channel mirror attachment fixtures 64, 66.

Top and bottom housing portions 30, 32 are sized such that, when top and bottom housing portions 30, 32 are secured together, tri-faceted mirror 14 is secured across mirror openings 42 (as shown in FIG. 1).

It can be seen from the preceding description that a trifaceted vehicle side view mirror assembly has been provided.

It is noted that the embodiment of the tri-faceted vehicle side view mirror assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A tri-faceted vehicle side view mirror assembly that is securable to the side of a vehicle; the tri-faceted vehicle side view mirror assembly comprising:

a two-part housing securable to the side of a vehicle; and a tri-faceted mirror member held within said two-part housing;

said tri-faceted mirror member being constructed from an acrylic plastic having a reflective coating provided on a back surface thereof and including a planar center mirror section and two mirror image angled opposed mirror end sections that extend from opposed side edges of said planar center section in said forward direction;

said two-part housing including a molded top housing portion and a molded bottom housing portion that are secured together with screws;

said top and bottom housing portions each having an open mirror connecting end section provided with a mirror opening;

said top housing portion having three top channel mirror attachment fixtures secured adjacent to said mirror opening and including a top center channel mirror attachment fixture and two top side channel mirror attachment fixtures, on either side of said top center channel attachment fixture and oriented with respect to said top center channel mirror attachment fixture such that when a top center edge of said mirror center section is seated into said top center channel mirror attachment fixture, a top side edge of a side mirror section is seated in each of said two top side channel mirror attachment fixtures;

said bottom housing portion having three bottom channel mirror attachment fixtures secured adjacent to said mirror opening and including a bottom center channel mirror attachment fixture and two bottom side channel mirror attachment fixtures, one on either side of said bottom center channel attachment fixture and oriented with respect to said bottom center channel mirror attachment fixture such that when a bottom center edge of said mirror center section is seated into said bottom center channel mirror attachment fixture, a bottom side edge of a side mirror section is seated in each of said two bottom side channel mirror attachment fixtures;

said top and bottom housing portions being sized such that when said top and bottom housing portions are secured together;

said tri-faceted mirror is secured across said mirror openings.

* * * * *